US010953912B2

(12) United States Patent
Rawlings et al.

(10) Patent No.: US 10,953,912 B2
(45) Date of Patent: Mar. 23, 2021

(54) STEERING WHEEL SYSTEMS AND TORQUE FEEDBACK ACTUATOR ASSEMBLIES FOR USE IN STEER-BY-WIRE VEHICLES

(71) Applicant: Ford Global Technologies, LLC, Dearborn, MI (US)

(72) Inventors: Jeremy Rawlings, Canton, MI (US); Robert Mrozek, Clinton Township, MI (US); Lodewijk Wijffels, Canton, MI (US); Eugene Lau, Mississauga (CA)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 15/921,224

(22) Filed: Mar. 14, 2018

(65) Prior Publication Data

US 2019/0283796 A1 Sep. 19, 2019

(51) Int. Cl.
| | |
|---|---|
| *B62D 5/00* | (2006.01) |
| *B62D 1/10* | (2006.01) |
| *F16H 1/16* | (2006.01) |
| *F16H 57/039* | (2012.01) |
| *B62D 6/00* | (2006.01) |
| *F16H 57/02* | (2012.01) |

(52) U.S. Cl.
CPC .............. *B62D 5/006* (2013.01); *B62D 1/10* (2013.01); *B62D 6/008* (2013.01); *F16H 1/16* (2013.01); *F16H 57/039* (2013.01); *F16H 2057/02034* (2013.01)

(58) Field of Classification Search
CPC ........ B62D 5/006; B62D 5/008; B62D 5/005; B62D 1/11; F16H 1/16; F16H 1/57; F16H 1/039; F16H 2057/02034
See application file for complete search history.

(56) References Cited

U.S. PATENT DOCUMENTS

| | | | | |
|---|---|---|---|---|
| 6,059,068 A | * | 5/2000 | Kato ..................... | B62D 5/006 180/402 |
| 6,079,513 A | * | 6/2000 | Nishizaki ............... | B62D 5/006 180/402 |
| 6,715,578 B2 | * | 4/2004 | Shimizu ................. | B62D 1/163 180/443 |
| 6,983,816 B2 | * | 1/2006 | Takahashi .............. | B62D 5/006 180/402 |

(Continued)

FOREIGN PATENT DOCUMENTS

| | | |
|---|---|---|
| DE | 10200826 | 5/2003 |
| DE | 10221242 | 10/2012 |

*Primary Examiner* — Ruth Ilan
*Assistant Examiner* — Harold Eric Pahlck, III
(74) *Attorney, Agent, or Firm* — Ray Coppiellie; Hanley, Flight & Zimmerman, LLC (57) ABSTRACT

Example steering wheel systems and torque feedback actuator assemblies for use in steer-by-wire vehicles are described herein. An example steering wheel system includes a steering wheel and a torque feedback actuator assembly. The torque feedback actuator assembly includes a housing and a helical gear rotatably disposed in the housing. The steering wheel is coupled to and coaxially aligned with the helical gear. The torque feedback actuator assembly also includes a motor with a worm gear engaged with the helical gear to provide torque feedback to the steering wheel by driving the helical gear.

20 Claims, 6 Drawing Sheets

(56) References Cited

U.S. PATENT DOCUMENTS

| | | | |
|---|---|---|---|
| 7,137,476 B2* | 11/2006 | Katagiri | B62D 5/001 |
| | | | 180/402 |
| 7,651,124 B2 | 1/2010 | Gulde | |
| 8,589,029 B2* | 11/2013 | Egenfeldt | B62D 5/0481 |
| | | | 701/42 |
| 9,840,279 B2* | 12/2017 | Abbas | B62D 1/00 |
| 9,896,123 B2* | 2/2018 | Maquire | B62D 5/0463 |
| 2007/0046013 A1* | 3/2007 | Bito | B62D 1/11 |
| | | | 280/777 |
| 2011/0153160 A1* | 6/2011 | Hesseling | B60K 35/00 |
| | | | 701/41 |
| 2012/0111658 A1* | 5/2012 | Hori | B62D 6/008 |
| | | | 180/446 |
| 2017/0225570 A1 | 8/2017 | El Aile et al. | |
| 2017/0267285 A1 | 9/2017 | Abbas et al. | |
| 2017/0361867 A1* | 12/2017 | Lewis | G01L 3/104 |
| 2018/0154925 A1* | 6/2018 | Steinkogler | B62D 5/001 |
| 2018/0238377 A1* | 8/2018 | Kim | B62D 6/10 |
| 2019/0092376 A1* | 3/2019 | Panse | B60R 25/02 |

* cited by examiner

STEERING WHEEL SYSTEMS AND TORQUE FEEDBACK ACTUATOR ASSEMBLIES FOR USE IN STEER-BY-WIRE VEHICLES

FIELD OF THE DISCLOSURE

This disclosure relates generally to vehicles and, more particularly, to steering wheel systems and torque feedback actuator assemblies for use in steer-by-wire vehicles.

BACKGROUND

Known vehicles typically include a mechanical linkage that connects the steering wheel to the front wheels of the vehicle and enables a driver to steer the vehicle by rotating the steering wheel. For example, many known steering systems include rack and pinion gears that translate rotational motion of a steering wheel to linear actuation or movement of one or more tie rods, which are connected to the front wheels of the vehicle. The tie rods change the angle of the front wheels, thereby turning the wheels and steering the vehicle.

In recent years, steer-by-wire systems have been implemented in vehicles. Steer-by-wire systems eliminate traditional mechanical linkage assemblies between the steering wheel and the wheels of the vehicle. Instead, an actuator operates to turn the wheels based on a rotational angle of the steering wheel.

SUMMARY

An example steering wheel system for use in a steer-by-wire vehicle is disclosed herein. The example steering wheel system includes a steering wheel and a torque feedback actuator assembly. The torque feedback actuator assembly of the example steering wheel system includes a housing and a helical gear rotatably disposed in the housing. The steering wheel is coupled to and coaxially aligned with the helical gear. The torque feedback actuator assembly also includes a motor with a worm gear engaged with the helical gear to provide torque feedback to the steering wheel by driving the helical gear.

An example vehicle disclosed herein includes a dashboard and a steering wheel system coupled to the dashboard to interface with a steer-by-wire system of the vehicle. The steering wheel system of the example vehicle includes a steering wheel and a torque feedback actuator assembly including a helical gear. The steering wheel is coupled to and coaxially aligned with the helical gear. The helical gear is to be driven in one direction or the other to rotate the steering wheel. The helical gear is disposed between the steering wheel and the dashboard.

An example apparatus disclosed herein includes a helical gear that is to be coupled to and aligned with a rotational axis of a steering wheel and a motor with a worm gear engaged with the helical gear. The motor is to drive the helical gear to provide torque feedback to the steering wheel. The motor and the worm gear are aligned along an axis that is perpendicular to and offset from the rotational axis.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example steering wheel systems and example torque feedback actuator assemblies for use in vehicle steer-by-wire systems. The example torque feedback actuator assemblies disclosed herein utilize smaller, lighter motors than known torque feedback actuators while still producing excellent torque feedback control on the steering wheel. Further, the example torque feedback actuator assemblies disclosed herein are smaller and, thus, require less room in the cabin of the vehicle than known torque feedback actuator assemblies in steer-by-wire vehicles. Before disclosing the example torque feedback actuator assemblies and related aspects in detail, a brief description of known steer-by-wire systems is provided below.

In known steer-by-wire systems, the steering wheel of the vehicle is not directly mechanically connected to the wheels. Instead, a sensor measures a steering wheel angle (SWA) of the steering wheel and an actuator is activated to turn the wheels in one direction or the other based on the measured SWA. Known steer-by-wire systems also include an electric motor (referred to as a torque feedback motor or actuator) to provide torque feedback on the steering wheel. In particular, to maintain the steering wheel at the corresponding angle as the wheels and to mimic the feel of a traditional steering wheel that is mechanically connected to the wheels, the torque feedback motor produces a counter-force on the steering wheel.

In known steer-by-wire systems, the steering wheel is connected to a steering column that extends into the dash of the vehicle. The torque feedback motor (including the body of the motor and the output shaft) is disposed in the dashboard and oriented parallel to the steering column. The output shaft of the motor is connected to the steering column via a belt and pulley system. Some of these known steer-by-wire systems also include a brake system that is connected to the steering column by another belt and pulley system. As such, a significant amount of space is needed in the dashboard of the vehicle to accommodate the torque feedback motor and associated components. In other known steer-by-wire systems, the motor is oriented along the same axis as the steering column and is connected directly to the steering column, which similarly requires a significant amount of space in the dashboard of the vehicle to accommodate the motor. Also, with a motor connected directly to the steering column (without gearing), the motor needs to be relatively large to provide proper torque feedback to the steering wheel. Further, these known steer-by-wire systems often include an external SWA sensor or a network of gears connected to the steering column that interface with a sensor that determines the SWA, which increases the overall envelope or packaging of the steer-by-wire system. As such, these known steer-by-wire systems are generally bulky, heavy, and complex. Also, some of these known steer-by-wire systems include redundant motors, sensors, belt systems, etc., which add further to the complexity and weight to the steer-by-wire system.

Disclosed herein are example torque feedback actuator assemblies that can provide torque feedback to a steering wheel as part of a steering wheel system for a steer-by-wire vehicle. Example torque feedback actuator assemblies disclosed herein that are generally smaller, lighter, and more compact than known assemblies. Some example torque feedback actuator assemblies can be easily attached and detached from a dashboard of a vehicle as desired. As such, the example torque feedback actuator assembly and steering wheel can be easily and quickly removed from the cabin of the vehicle when not being used, which creates more usable space in the cabin of the vehicle. For example, if the vehicle is capable of operating in an autonomous mode and the steering wheel is not needed, the torque feedback actuator assembly and/or steering wheel can be removed or folded away and stored. In other examples, the torque feedback actuator assembly and steering wheel may remain on the dashboard while the vehicle operates in autonomous mode. In some such examples, the motor of the torque feedback actuator assembly is used to keep the steering wheel stationary at a particular position (e.g., at the 0° position). For example, a small amount of current may be provided to the motor, which maintains the steering wheel at the particular position, and, if a user attempts to rotate the steering wheel, a larger current is provided to the motor that creates a counter torque (e.g., resistance), against the user's force, to maintain the steering wheel in the same position. Also, in some examples, the example steering system and/or torque feedback actuator assembly can be used in other vehicles by attaching the torque feedback actuator assembly to a dashboard of another steer-by-wire vehicle.

An example torque feedback actuator assembly disclosed herein includes a helical gear (sometimes referred to as a worm wheel) that is coupled to a steering wheel in a coaxial manner. In some examples, the helical gear is disposed within a housing that may be coupled to the dashboard for mounting the torque feedback actuator assembly in the vehicle. The example torque feedback actuator assembly includes an electric motor (sometimes referred to as a torque feedback motor or actuator) with a worm gear that is engaged with the helical gear. The motor and the worm gear are orientated along an axis that is perpendicular to and offset from the central rotational axis of the steering wheel and helical gear. As a result, the motor does not extend far (if at all) into the depth of the dashboard, as is the case in known steer-by-wire systems that generally require significant space in the dashboard. In other words, the motor is disposed in a generally sideways or transverse orientation, which enables the motor and the helical gear to utilize less space (e.g., depth) behind the steering wheel. Further, in some examples, the example torque feedback actuator assembly does not include a steering column extending into or through the dashboard like those in known systems.

The motor of the example torque feedback actuator assembly may be activated to rotate the helical gear and, thus, rotate the steering wheel. For example, the motor may be activated to provide torque feedback to the steering wheel while the user is driving the vehicle in a manner that simulates the counter-force the wheels would otherwise impart to the steering wheel via a traditional mechanical linkage assembly. Further, the motor creates counter force on the steering wheel that keeps the steering wheel in the correct position aligned with the wheels, which enables the driver to detect the angle of the wheels. For example, when the driver releases the steering wheel after a turn, the motor acts to rotate the steering wheel back to the straight position as the wheels straighten out, as would be experienced in a traditional mechanical linkage assembly.

In some examples, the worm gear and the helical gear form a relatively high gear ratio, such as 50:1, which enables the use of a relatively small motor while still producing relatively high torque on the helical gear, thereby further decreasing the overall size, weight, and complexity of the steer-by-wire system. Further, the relatively high gear ratio is also beneficial for achieving high precision torque feedback to the driver.

In some examples, the torque feedback actuator assembly includes an angle sensor that measures the rotational angle of the helical gear, which can be directly correlated to the SWA of the steering wheel. In some examples, the angle sensor is implemented as a Hall Effect sensor of an electronic control unit (ECU) of the actuator assembly. The ECU may be implemented on a printed circuit board coupled to the housing in a location where the Hall Effect sensor extends into the housing and adjacent the helical gear. The Hall Effect sensor measures a rotational angle of the helical gear, which can be correlated to the SWA (e.g., the angle of the helical gear is the same as the angle of the steering wheel). By using an angle sensor close to the helical gear, the actuator assembly can remain relatively small and compact, unlike known systems that utilize multiple gears extending from a steering column to determine the SWA.

In some examples, the torque feedback actuator assembly includes a stopping or locking mechanism that prevents the steering wheel from being over rotated in either direction. In particular, because the steering wheel is coupled to the helical gear (which is free to rotate in the housing) and is not directly mechanically coupled to the wheels of the vehicle, the steering wheel is capable of being rotated continuously in either direction. However, in some instances, the steering wheel system may include a clockspring to provide power to the electronics on the steering wheel. To prevent the steering wheel from being rotated too far in either direction and damaging the clockspring cable, the example torque feedback actuator assembly includes a stopping or locking mechanism that stops rotation at a predefined angle.

In some examples, the steering wheel system and/or the vehicle include(s) a collapsing mechanism that enables the steering wheel system to move into or toward the dashboard in the event of a collision to reduce the impact to the driver's body. For instance, in the event of a vehicle collision, the driver's body may move into the steering wheel. To dampen the impact, the steering wheel system, including the torque feedback actuator assembly, may move into or toward the dashboard to reduce the impact if a threshold force is exerted on the steering wheel system.

Figure 1:
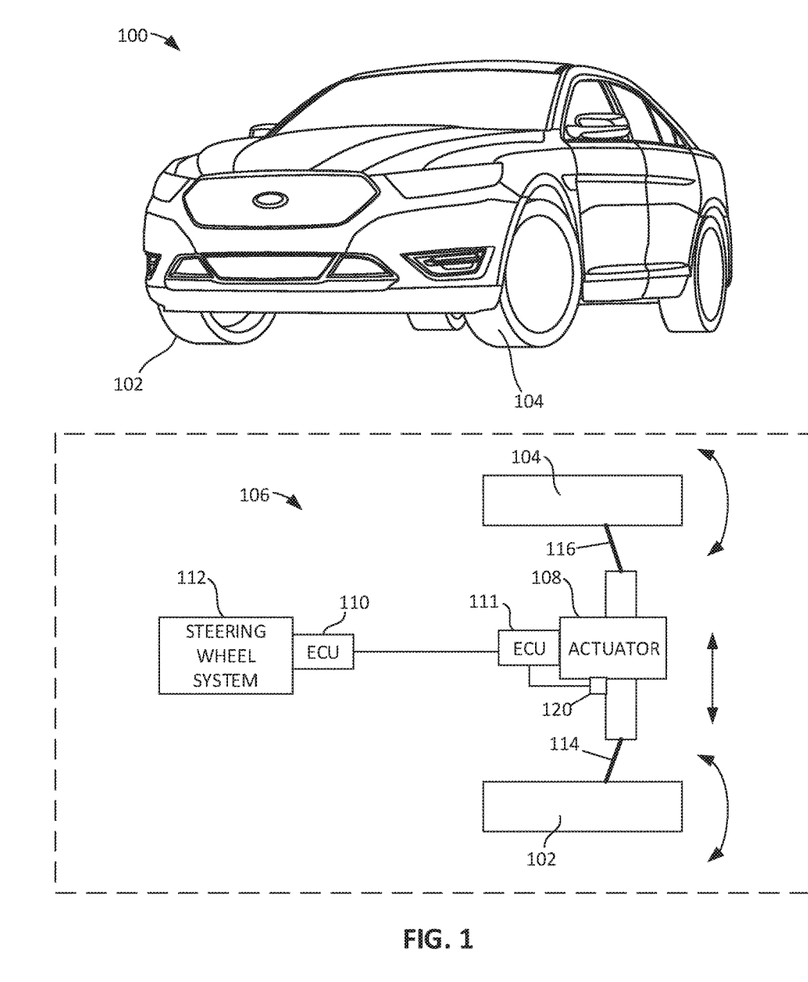
FIG. 1 illustrates an example vehicle and an example steer-by-wire system of the vehicle in which examples disclosed herein may be implemented.

FIG. 1 illustrates an example vehicle 100 in which the examples disclosed herein may be implemented. In the illustrated example, the vehicle 100 is depicted as a car (e.g., a sedan). However, in other examples, the vehicle 100 may be implemented as any other type of vehicle, such as a pick-up truck, a van, etc. The vehicle 100 includes a right front wheel 102 and a left front wheel 104 that may be turned or angled to steer the vehicle 100.

FIG. 1 also illustrates a block diagram of an example steer-by-wire system 106 that may be implemented by the vehicle 100. As shown in the example block diagram, the steer-by-wire system 106 includes an actuator 108 (e.g., a rotary motor, a hydraulic motor, etc.) and a steering wheel system 112. The steering wheel system 112 is controlled by a first electrical control unit (ECU) 110 (e.g., a controller), which communicates with a second ECU 111 that controls the actuator 108. The first and second ECU 110, 111 form a steer-by-wire controller. The actuator 108 is coupled to tie rods 114, 116 that are coupled to the front wheels 102, 104, respectively. The actuator 108 may be activated (e.g., via the second ECU 111) to extend and/or retract the tie rods 114, 116 to turn or angle the front wheels 102, 104, thereby steering the vehicle 100. The actuator 108 may be activated based on input from the steering wheel system 112.

In the illustrated example, the steering wheel system 112 includes a steering wheel and a SWA sensor (both of which are shown and described in further detail herein) that measures a rotational angle of the steering wheel. The first ECU 110 determines the SWA (based on the measurements from the SWA sensor) and transmits the determined SWA to the second ECU 111, which activates the actuator 108 to turn the front wheels 102, 104 based on the SWA. The second ECU 111 may apply a linear or non-linear correlation between the SWA and the angle of the front wheels 102, 104.

In some examples, the steer-by-wire system 106 includes a position sensor 120 that detects the current angle of the front wheels 102, 104 (e.g., based on a position of the actuator 108) and provides the feedback to the second ECU 111 and, thus, to the first ECU 110. In response, the first ECU 110 may activate a torque feedback actuator (examples of which are disclosed in further detail herein) in the steering wheel system 112. The torque feedback actuator maintains the steering wheel at the corresponding SWA (i.e., the SWA that matches or correlates to the current angle of the front wheels 102, 104) and/or provides torque feedback on the steering wheel to mimic the force the front wheels 102, 104 would otherwise have on the steering wheel in a traditional mechanical linkage assembly.

While in the illustrated example the first and second ECUs 110, 111 are shown as independent components, in other examples, the first and second ECUs 110, 111 may be implemented by a common/combined ECU in communication with the steering wheel system 112 and the actuator 108. The first and/or second ECU(s) 110, 111 may be implemented by hardware, software, firmware and/or any combination of hardware, software and/or firmware. For example, the first and/or second ECU(s) 110, 111 could be implemented by one or more analog or digital circuit(s), logic circuits, programmable processor(s), programmable controller(s), digital signal processor(s) (DSP(s)), application specific integrated circuit(s) (ASIC(s)), programmable logic device(s) (PLD(s)) and/or field programmable logic device(s) (FPLD(s)). Also, while in the illustrated example the steer-by-wire system 106 includes one actuator 108, in other examples, the steer-by-wire system 106 may include more actuators and/or the actuator(s) may be disposed in other locations and used to control the direction of the front wheels 102, 104. Further, the steer-by-wire system 106 may include more than one position sensor 120 to detect the current angle of the front wheel(s) 102, 104 and/or the position sensor(s) may be disposed in other locations (e.g., on the hubs of the wheels).

Figure 2:
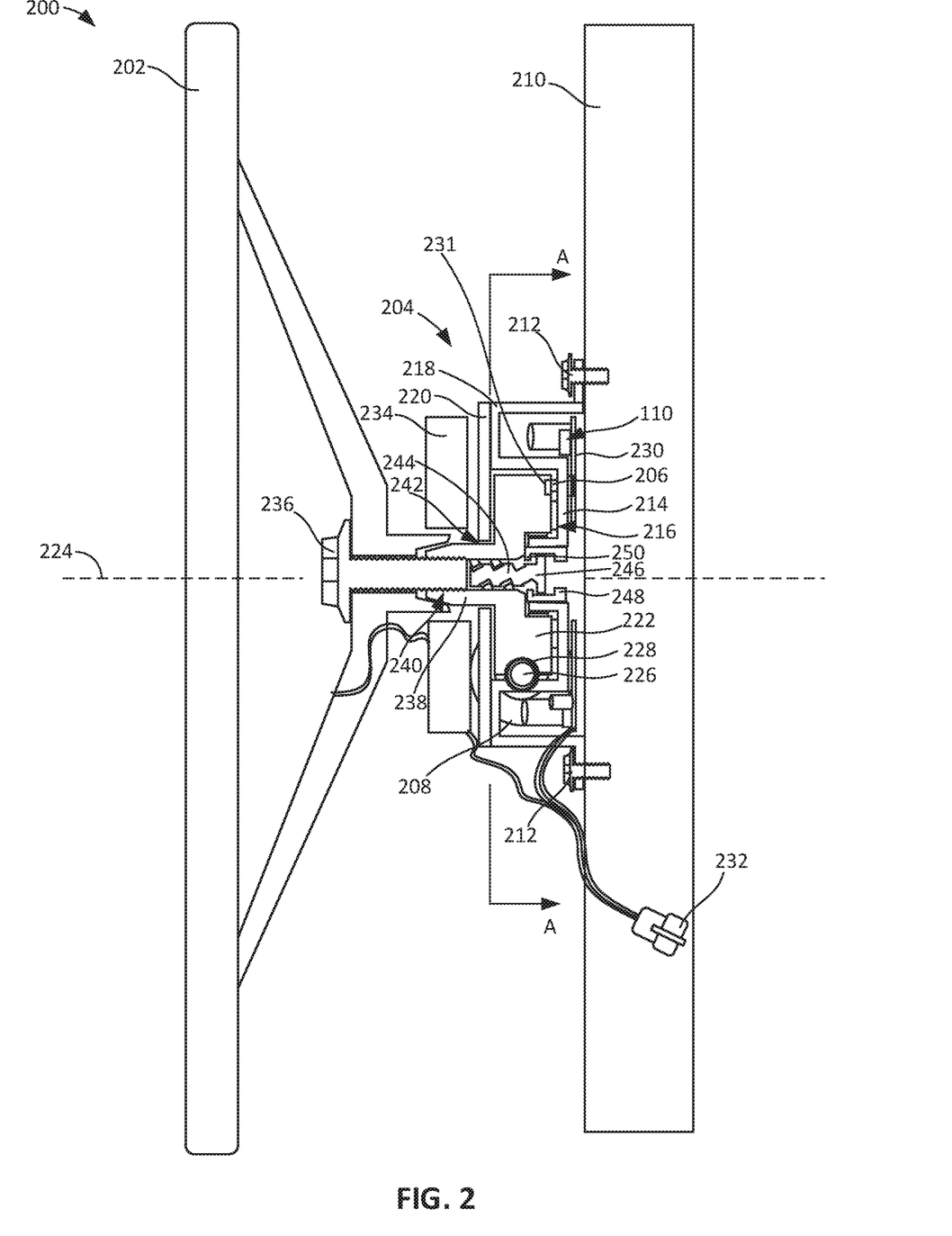
FIG. 2 is a side view of an example steering wheel system having an example torque feedback actuator assembly constructed in accordance with teachings of this disclosure.

FIG. 2 is a side view of an example steering wheel system 200 constructed in accordance with teachings of this disclosure. The example steering wheel system 200 may be used to implement the steering wheel system 112 of FIG. 1, for example. The example steering wheel system 200 includes an example steering wheel 202 and an example torque feedback actuator assembly 204 (referred to herein as the actuator assembly 204). In the illustrated example, the actuator assembly 204 includes an angle sensor 206 to determine the SWA of the steering wheel 202. The example actuator assembly 204 also includes a motor 208 to provide torque feedback to the steering wheel 202.

In the illustrated example, the steering wheel system 200 is coupled to an instrument panel or dashboard 210 of the vehicle 100 (FIG. 1). In particular, the torque feedback actuator assembly 204 is coupled to the dashboard 210, and the steering wheel 202 is coupled to the actuator assembly 204. As used herein, the terms dashboard and instrument panel are used interchangeably and are defined to mean the surface and/or structure in front of the driver. The dashboard 210 may include one or more gauges, buttons, status indicators, screens, etc. In some examples, the actuator assembly 204 is removably coupled to the dashboard 210. In the illustrated example, the actuator assembly 204 is coupled to the dashboard 210 via a plurality of threaded fasteners 212. In other examples, other types of fastening mechanisms may be used. As such, a user (e.g., the driver) can easily attach the steering wheel system 200 to the dashboard 210 when it is desired to use the steering wheel system 200 and detach the steering wheel system 200 from the dashboard 210 when it is not being used. For example, the vehicle 100 may be operable in two modes: (1) a full autonomous mode in which the vehicle 100 drives itself; or (2) a manual steer mode in which the steering wheel system 200 may be used to steer the vehicle 100. During the full autonomous mode, the steering wheel system 200 is not required. As such, the example steering wheel system 200 may be detached from the dashboard 210 (e.g., by removing the threaded fasteners 212, by releasing a quick release, etc.) to provide more room in the cabin of the vehicle 100 (e.g., more room between a person sitting in the driver seat and the dashboard 210). In other examples, when the vehicle 100 is operating in an autonomous mode, the steering wheel system 200 may remain coupled to the dashboard 210 and the actuator assembly 204 may operate in a mode (e.g., a silent wheel mode) to keep the steering wheel 202 stationary, as disclosed in further detail herein. Also, in some examples, the steering wheel system 200 may be universal such that it can be used with other vehicles. For example, the steering wheel system 200 can be used to similarly control other vehicles. Further, in some examples, the steering wheel system 200 may be detached from the dashboard 210 when the vehicle 100 is not being used, for example, to prevent theft and/or tampering with the vehicle 100.

As disclosed above, because the steering wheel 202 is not directly mechanically coupled (e.g., via a steering column) to the front wheels 102, 104 (FIG. 1), the steering wheel 202 is not directly responsive to changes in the direction of the front wheels 102, 104. For example, in a vehicle having a traditional linkage assembly, after making a turn, a person can release the steering wheel and the change in direction of the wheels causes the steering wheel to rotate back to the straight position (i.e., self-center). Therefore, to maintain the steering wheel 202 at the correct SWA and to mimic or simulate the movement of the front wheels 102, 104 on the steering wheel 202 when coupled to the wheels 102, 104 via a traditional mechanical linkage assembly, the example actuator assembly 204 includes the motor 208. The motor 208 may be activated to create a counter-force on the steering wheel 202 against the force of the driver. Further, the motor 208 may be activated to position the steering wheel 202 at the correct SWA that correlates to the current angle of the front wheels 102, 104, as would be experienced in a traditional linkage assembly.

In the illustrated example, the actuator assembly 204 includes a housing 214 that defines a cavity 216. In the illustrated example, the housing 214 is constructed of a first piece or component 218 and a second piece or component 220 that are coupled to define the cavity 216. However, in other examples the housing 214 may be constructed of a single unitary component or may be constructed of more than two components.

In the illustrated example of FIG. 2, the actuator assembly 204 includes a helical gear 222 that is rotatably disposed in the cavity 216 of the housing 214. The steering wheel 202 is coupled to the helical gear 222 such that the steering wheel 202 and the helical gear 222 rotate together. In the illustrated example, the steering wheel 202 and the helical gear 222 are coaxially aligned along a first axis 224. In other words, the helical gear 222 has a central (rotational) axis that is aligned with a central (rotational) axis of the steering wheel 202, both of which are aligned along the first axis 224.

In the illustrated example of FIG. 2, the motor 208 has an output shaft 226 coupled to a worm gear 228. The worm gear 228 is engaged with (e.g., meshed with) teeth on an edge of the helical gear 222 (sometimes referred to as a worm drive arrangement). The motor 208, when activated, rotates the worm gear 228, which rotates the helical gear 222 and, thus, rotates the steering wheel 202. Thus, the motor 208 provides torque feedback to the steering wheel 202 by driving the helical gear 222. In some examples, the motor 208 is a bidirectional motor that can rotate the worm gear 228 (and, thus, the helical gear 222 and the steering wheel 202) in either direction.

Figure 3:
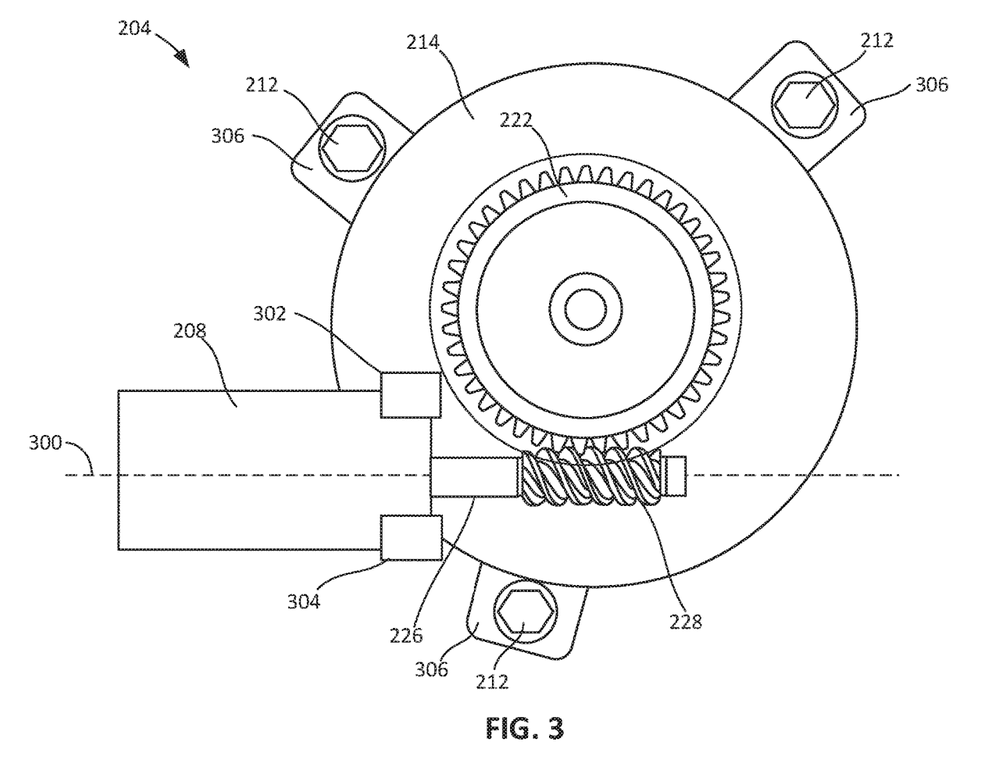
FIG. 3 is a cross-sectional view of the example torque feedback actuator assembly of FIG. 2 taken along line A-A in FIG. 2.
Figure 4:
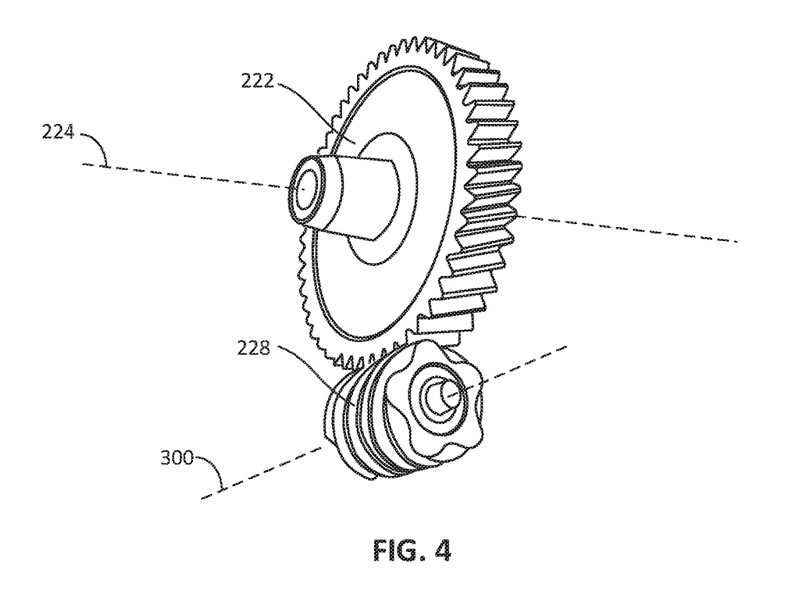
FIG. 4 is a perspective view an example worm gear and an example helical gear of the example torque feedback actuator assembly of FIGS. 2 and 3.

FIG. 3 is a cross-sectional view of the example actuator assembly 204 taken along line A-A of FIG. 2. As illustrated in FIG. 3, the motor 208 (e.g., the body of the motor 208), the output shaft 226, and the worm gear 228 are aligned along a second axis 300. The second axis 300 is transverse or perpendicular to and offset from the first axis 224 (FIG. 2) along which the steering wheel 202 (FIG. 2) and the helical gear 222 rotate. FIG. 4 shows a perspective view of the helical gear 222, the first axis 224, the worm gear 228, and the second axis 300.

Referring back to FIG. 2, the second axis 300 (from FIG. 3) extends into the page through a center of the worm gear 228. As such, the worm gear 228 and the helical gear 222 transfer rotational motion from one axis to another axis, which are perpendicular and offset from each other. By orienting the motor 208 along the second axis 300, which is perpendicular to and offset from the first axis 224, the motor 208 extends sideways or transversely relative to the face of the dashboard 210, rather than into the dashboard 210 as in known systems in which motors are orientated parallel to the rotational axis of the steering wheel and therefore extend into the face of the dashboard or require significant space between the steering wheel and the dashboard. As such, the motor 208 consumes significantly less (minimal) space between the steering wheel 202 and the dashboard 210 than these known systems. In this example, when the actuator assembly 204 is coupled to the dashboard 210, the motor 208 and the helical gear 222 are disposed between the steering wheel 202 and the dashboard 210 and, thus, utilize less (if any) space in the dashboard 210 of the vehicle 100 as in known systems. Therefore, in some examples, the steering wheel system 200 does not include or require a steering column extending in the dashboard 210 as in known system. In other examples, the motor 208 and/or other components of the actuator assembly 204 may extend into the dashboard 210 (e.g., into a recess or opening formed in an outer surface of the dashboard 210). In either configuration, the packaging of the example actuator assembly 204 is substantially smaller and less deep than known assemblies and thus, extends less into the dashboard 210 than known assemblies.

As shown in the illustrated example of FIG. 3, the housing 214 includes first and second brackets 302, 304 to hold the motor 208. In other examples, the actuator assembly 204 may include more brackets and/or additional structures to couple the motor 208 to the housing 214. In the illustrated example, the housing 214 also includes three tabs or flanges 306 through which the threaded fasteners 212 pass. In other examples, the housing 214 may include more or fewer flanges 306 depending on the number of fasteners to be used, for example.

The example motor 208 may be, for example, a brushless 3-phase direct current (DC) motor. In other examples, the motor 208 may be another type of motor (e.g., an alternating current (AC) motor). In some examples, the helical gear 222 and the worm gear 228 and are sized to provide a worm ratio or gear reduction ratio of 50:1. With such a high gear ratio, the motor 208 can be relatively small while still producing a relatively large torque on the helical gear 222, such as 50 newton meters (nm) of torque. As such, a smaller, lighter motor can be employed instead of bulky, large motors as in known systems. In other examples, the helical gear 222 and the worm gear 228 may be sized to provide a higher or lower gear reduction ratio.

Referring back to FIG. 2, the example actuator assembly 204 includes an electrical control unit (ECU) board 230 that supports the first ECU 110 for activating the motor 208 and/or determining the SWA. In the illustrated example, the ECU board 230 is coupled to a back side of the housing 214 (e.g., a side of the housing 214 facing the dashboard 210). In other examples, the ECU board 230 may be coupled to the housing 214 in another location. As disclosed above, the example actuator assembly 204 includes the angle sensor 206 to determine the SWA. In this example, the angle sensor 206 measures or detects a rotational angle of the helical gear 222, which can then be used by the first ECU 110 to determine the SWA. For example, because the steering wheel 202 and the helical gear 222 are coupled to each other to rotate together, the rotational angle of the helical gear 222 equals the SWA. The first ECU 110 determines the SWA based on the rotational angle of the helical gear 222, which is then communicated to the second ECU 111 (FIG. 1) for activating the actuator 108.

In some examples, the relatively large gear ratio between the helical gear 222 and the worm gear 228 results in a small resistance when turning the steering wheel 202, which helps mimic the resistance felt in a steering wheel with a traditional mechanical linkage assembly (instead of allowing the steering wheel 202 to rotate loosely). Further, in some examples, the first ECU 110 applies a small voltage to the motor 208, which further helps create resistance on the steering wheel 202 that can be felt by the driver when turning the steering wheel 202. As the vehicle 100 is driving, the first ECU 110 determines a target torque (e.g., a restoring force) to apply to the helical gear 222 based on the SWA and the angle of the front wheels 102, 104 (FIG. 1). The first ECU 110 applies a larger or smaller voltage to the motor 208 depending on the torque to be applied to the steering wheel 202.

In the illustrated example, the angle sensor 206 is coupled to the ECU board 230 and extends through an opening in the housing 214 into the cavity 216 adjacent the helical gear 222. This location enables a smaller, more compact packaging. In some examples, the angle sensor 206 is a Hall Effect sensor. In some such examples, one or more magnets may be provided on the rear side of the helical gear 222. For example, one ring-shaped magnet may be provided on the rear side of the helical gear 222 (e.g., the side facing the ECU board 230). In another example, multiple magnets (e.g., three magnets) may be coupled to the rear side of the helical gear 222 and spaced apart from the each other (e.g., spaced equidistant from each other). An example magnet 231 is shown in FIG. 2 coupled to the rear side of the helical gear 222. The Hall Effect sensor measures the strength of the magnetic field as the helical gear rotates 222. Based on the measured magnetic field, the first ECU 110 can determine the angular position of the helical gear 222 and, thus, the SWA. In some examples, multiple Hall Effect sensors are disposed on the ECU board 230 and measure the magnetic field caused by the magnet(s), which may be used to determine (e.g., via triangulation) the rotational angle of the helical gear 222. In another example, a separate smaller gear may be rotated by the helical gear 222. The smaller gear may have one or more magnet(s), and the Hall Effect sensor may measure the strength of the magnetic field of the smaller gear, which may be used to determine the rotational position of the helical gear 222. In still other examples, the angle sensor 206 may be implemented as another type of sensor. Further, in some examples, more than one angle sensor may be used.

In some examples, when the vehicle 100 is operating in an autonomous mode, the actuator assembly 204 may operate in a quiet mode to keep the steering wheel 202 stationary (e.g., at the 0° position). For example, the first ECU 110 may apply a small current to the motor 208, which locks the steering wheel 202 in place against small forces. If a larger force is applied to the steering wheel (e.g., if a passenger attempts to rotate the steering wheel 202), the angle sensor 206 may sense the attempted rotation of the steering wheel 202 and the first ECU 110 may apply a larger current to the motor 208, which creates a larger torque feedback on the steering wheel 202 that keeps the steering wheel 202 in the same position.

In the illustrated example, the actuator assembly 204 includes an electrical connector 232 (e.g., a wiring harness) that connects to the first ECU 110 and/or a clockspring 234 (disclosed in further detail herein) of the actuator assembly 204 to the second ECU 111 (FIG. 1) and/or any other ECU of the vehicle 100. The electrical connector 232 may be connected to a corresponding connector in the vehicle 100 (e.g., on the dashboard 210) to receive power and/or communicate with the other systems of the vehicle 100, such as the second ECU 111 (FIG. 1).

In the illustrated example, the steering wheel 202 is removably coupled to the helical gear 222 via a threaded fastener 236, such as a retaining bolt. In the illustrated example, the helical gear 222 includes an extension 238 with a threaded opening 240. The extension 238 extends through an opening 242 in the housing 214. The threaded fastener 236 is inserted through the steering wheel 202 and screwed into the threaded opening 240 of the extension 238 to couple the steering wheel 202 to the helical gear 222. However, in other examples, the steering wheel 202 may be coupled to the helical gear 222 using other mechanical and/or chemical fastening mechanisms (e.g., a slot and key, a pin, an adhesive, welding, etc.). In some examples, the steering wheel 202 is fixedly coupled to the helical gear 222 and cannot be removed from the helical gear 222 without damage to the parts of the steering wheel system 200.

In some examples, the steering wheel system 200 includes the clockspring 234. The clockspring 234 enables the steering wheel 202 to rotate while still providing electrical connectivity to one or more electronic components (e.g., an airbag, a volume button, a cruise control button, a horn button, etc.) on the steering wheel 202. In particular, the clockspring 234 is operatively coupled to the steering wheel 202 (e.g., via a cable) to provide electrical power to the one or more electronic components on the steering wheel 202 and/or communicate signals between the one or more electronic components on the steering wheel 202 and an ECU of the vehicle 100. In the illustrated example, the clockspring 234 is disposed between the housing 214 and the steering wheel 202. In some examples, the clockspring 234 is coupled to the housing 214 and remains stationary with the housing 214.

In some examples, to prevent the steering wheel 202 from being rotated beyond a threshold amount in either direction (clockwise or counter-clockwise), the actuator assembly 204 includes a stopping or locking mechanism. For example, as shown in FIG. 2, the example actuator assembly 204 includes a lockout bolt 244. The lockout bolt 244 is threadably engaged with the threaded opening 240 of the helical gear 222. In some examples, the section of the threaded opening 240 engaged by the lockout bolt 244 has a different thread size than the section of the threaded opening 240 engaged by the threaded fastener 236. A head 246 of the lockout bolt 244 is disposed between a first stop 248 and a second stop 250 of the housing 214. The lockout bolt 244 may be keyed and/or disposed in an opening that prevents the lockout bolt 244 from rotating. Instead, the lockout bolt 244 only moves in a linear direction into or out of the threaded opening 240 (to the left and right in FIG. 2) as the helical gear 222 is rotated. Thus, as the steering wheel 202 and the helical gear 222 are rotated in one direction, the lockout bolt 244 is moved toward the dashboard 210 (e.g., to the right in FIG. 2) and, as the steering wheel 202 and the helical gear 222 are rotated in the opposite direction, the lockout bolt 244 is moved toward the steering wheel 202 (e.g., to the left in FIG. 2). When the lockout bolt 244 is moved beyond a threshold amount in either direction, the head 246 of the lockout bolt 244 engages or contacts one of the stops 248, 250, which prevents the lockout bolt 244 from moving further and, thus, prevents the helical gear 222 and the steering wheel 202 from being rotated further.

In some examples, the lockout bolt 244 is arranged to allow the steering wheel 202 to rotate within a threshold range of ±360°. The threshold range may be defined by the thread size of the threaded opening 240 and the lockout bolt 244, the length of the lockout bolt 244, and/or the distance between the two stops 248, 250. In other examples, the lockout bolt 244 can be arranged to allow the steering wheel 202 to rotate in a larger or smaller threshold range (e.g., ±270°, ±540°, etc.).

The lockout bolt 244 also advantageously prevents rotation even when no power is provided to the actuator assembly 204. For example, if the vehicle 100 (FIG. 1) is powered off and a person tries to rotate the steering wheel 202 (and no counter force is provided by the motor 208), the lockout bolt 244 prevents the steering wheel 202 from being rotated beyond a threshold amount that could break or damage the actuator assembly 204. Also, if the steering wheel system 200 includes a clockspring, such as the clockspring 234, the lockout bolt 244 prevents the steering wheel 202 from being rotated beyond a threshold amount (e.g., based on the length of electrical cable in the clockspring 234) in either direction that would otherwise break or damage the clockspring 234. While in the illustrated example the lockout bolt 244 is used to limit the amount the steering wheel 202 can be rotated in either direction, in other examples, other types of stopping or lockout mechanisms may be used, such as a ball screw, a threaded worm/nut, a cam, a hard stop, etc.

In the illustrated example, the housing 214 is coupled to the dashboard 210 via the threaded fasteners 212, which enables the actuator assembly 204 to be easily attached to and detached from the dashboard 210. In the illustrated example of FIGS. 2 and 3, three threaded fasteners 212 are used (two of which are shown in FIG. 2). In other examples, the housing 214 may be coupled to the dashboard 210 using more or fewer threaded fasteners. In other examples, other types of fastening mechanism(s) (e.g., pin and slot fasteners, snaps, a quick release, etc.) may be used to attach the housing 214 and/or another part of the actuator assembly 204 to the dashboard 210 and/or any other structure of the vehicle 100. In some examples, the torque feedback actuator assembly 204 is coupled to a relatively flat surface or panel of the dashboard 210.

Figure 5:
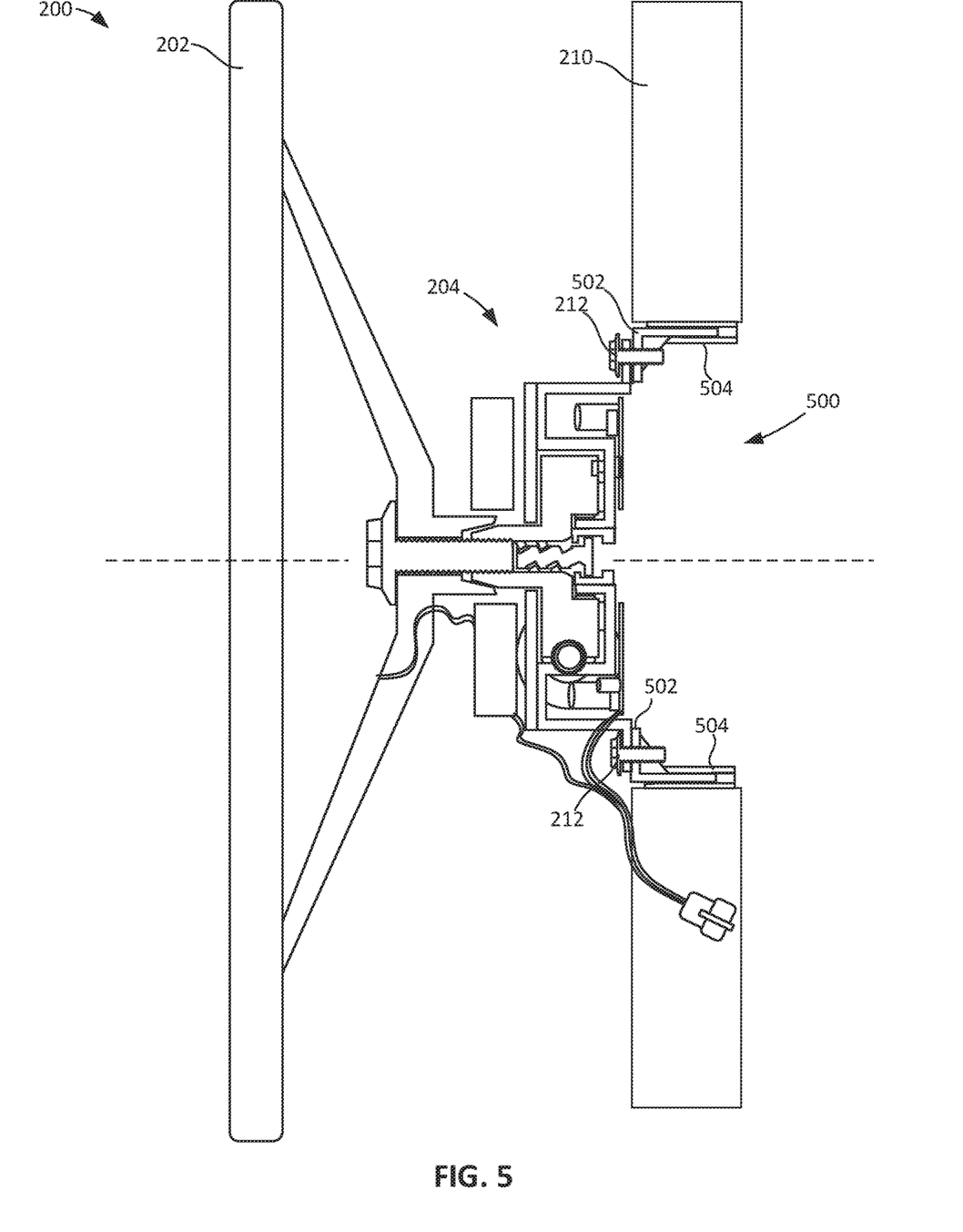
FIG. 5 illustrates an example collapsing mechanism that may be used with the example steering wheel system of FIG. 2.
Figure 6A:
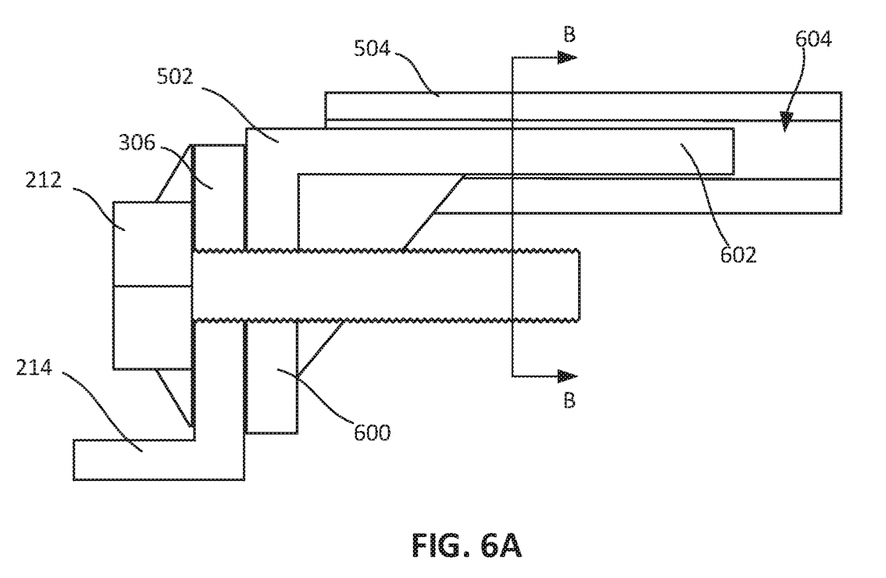
FIG. 6A is a side view of an example collapsing bracket used in the example of FIG. 5.
Figure 6B:
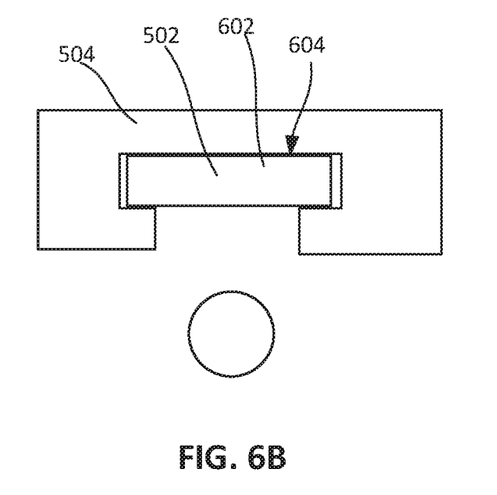
FIG. 6B is a cross-sectional view of the example collapsing bracket taken along line B-B in FIG. 6A.

In some examples, the steering wheel system 200 and/or the vehicle 100 may include a collapsing mechanism that enables the steering wheel system 200 to move or collapse into the dashboard 210 in the event of impact (e.g., during a collision). For example, in the illustrated example of FIG. 5, the dashboard 210 includes an opening or recess 500, and the torque feedback actuator assembly 204 is coupled to the dashboard 210 around the opening 500. In the illustrated example, the threaded fasteners 212 are connected to respective collapsing brackets 502, which are coupled to respective rails 504 that extend into the dashboard 210. FIG. 6A is an enlarged view of one of the collapsing brackets 502 and the corresponding rail 504, and FIG. 6B is a cross-sectional view of the example collapsing bracket 502 and the example rail 504 taken along line B-B in FIG. 6A. As shown in FIG. 6A, the collapsing bracket 502 includes a first portion 600 (e.g., a face portion) and a second portion 602, which are coupled to form a 90° corner. The threaded fastener 212 couples the flange 306 of the housing 214 to the first portion 600 of the collapsing bracket 502. The second portion 602 is disposed in a slot 604 of the rail 504, as shown in FIGS. 6A and 6B. The interface (e.g., friction) between the walls of the slot 604 and the second portion 602 hold the collapsing bracket 502 in place until a threshold force is applied. When a threshold force is applied, the collapsing bracket 502 slides further into the slot 604 in the rail 504. Therefore, should the driver (or another object) engage the steering wheel 202 (FIG. 5) and/or airbag on the steering wheel 202 (e.g., during a collision) with a sufficient force (e.g., a threshold force), the collapsing brackets 502 slide into the rails 504, which enables the steering wheel system 200 to move into the opening 500 (FIG. 5) in the dashboard 210, which helps reduce the impact imparted to the driver. In other examples, a strap or tab may be disposed in the slot 604 that, when engaged by the collapsing bracket 502 with a sufficient force, breaks or snaps and enables the collapsing bracket 502 to slide along the rail 504.

Figure 7:
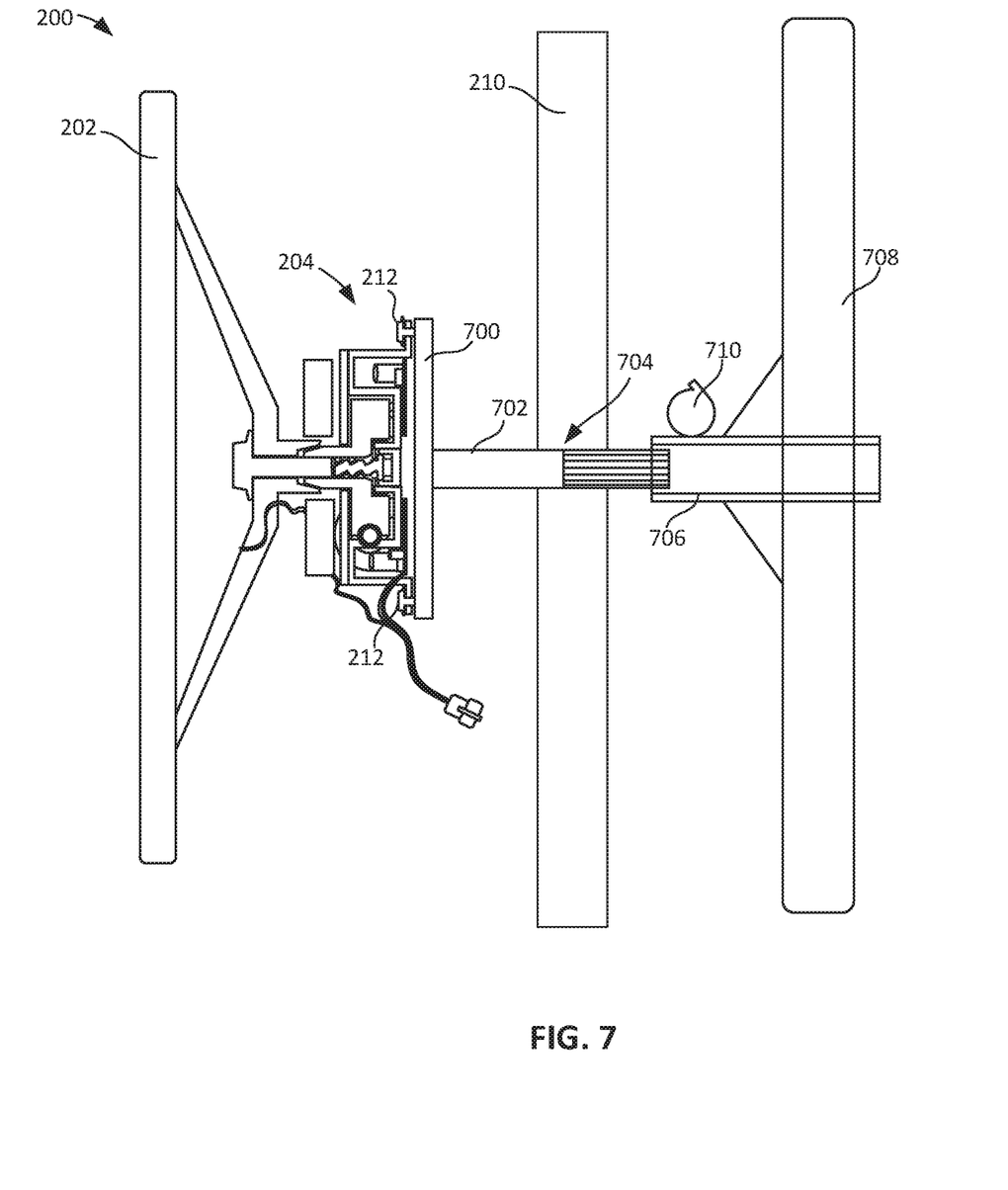
FIG. 7 illustrates another example collapsing mechanism that may be used with the example steering wheel system of FIG. 2.

FIG. 7 illustrates another example collapsing mechanism that may be implemented with the example steering wheel system 200. In the example of FIG. 7, the example steering wheel system 200 is coupled, via the fasteners 212, to a plate 700. A shaft 702 extends from a rear of the plate 700. The shaft 702 may be inserted through an opening 704 in the dashboard 210 and into a tube 706 mounted (e.g., welded) on a cross beam 708. The shaft 702 and the tube 706 may be splined to prevent the shaft 702 from rotating relative to the tube 706. In the illustrated example, a locking lever 710 is coupled to the tube 706. The locking lever 710 locks the shaft 702 in the tube 706 at a desired depth, which enables a user to change the location of the steering wheel system 200 relative to the dashboard 210 (e.g., enables the steering wheel system 200 to telescope in or out of the dashboard 210). The locking lever 710 may be a manual locking lever (e.g., activated manually by a hand of a user) or an electronic locking lever (e.g., activated via a button on the dashboard 210). In some examples, the shaft 702 can be removed from the tube 706, which enables the steering wheel system 200, along with the plate 700 and the shaft 702, to be removed from the dashboard 210 and stowed away (e.g., when the vehicle 100 is not being used, when the vehicle 100 is operating in an autonomous mode and the steering wheel system 200 is not needed, etc.). In some examples, the cross beam 708 and/or the tube 706 is rotatable, such that the steering wheel system 200 can be rotated downward and stored beneath the dashboard 210. In some examples, the locking lever 710 allows the shaft 702 to move into the tube 506 when a threshold force is exerted on the locking lever 710. As such, if the driver contacts the steering wheel 202 (e.g., during a collision), the steering wheel system 200 can move toward the dashboard 210 to reduce the impact on the driver.

From the foregoing, it will be appreciated that example systems, apparatus, and articles of manufacture have been disclosed that provide torque feedback on a steering wheel of a steer-by-wire vehicle. The example torque feedback actuator assemblies disclosed herein have a relatively short or shallow depth compared to known torque feedback actuator assemblies that extend far into the depth of the dashboard. Further, the example torque feedback actuator assemblies can be easily detached from a vehicle when not being used and stowed away to provide more room in the cabin of the vehicle. Also, the example torque feedback actuator assemblies utilize a worm gear and helical gear that enables use of a relatively small motor while still producing relatively high torque feedback on the steering wheel.

Although certain example systems, apparatus, and articles of manufacture have been disclosed herein, the scope of coverage of this patent is not limited thereto. On the contrary, this patent covers all systems, apparatus and articles of manufacture fairly falling within the scope of the claims of this patent.

What is claimed is:
1. A steering wheel system for use in a steer-by-wire vehicle, the steering wheel system comprising:
   a steering wheel; and
   a torque feedback actuator assembly including:
      a housing;

a helical gear rotatably disposed in the housing, the steering wheel coaxially aligned with the helical gear, the helical gear including an extension with a threaded opening extending from the housing;
a first bolt inserted through the steering wheel and threadably coupled to the extension to couple the steering wheel to the helical gear;
a second bolt threadably engaged with the threaded opening, the second bolt to move in a linear direction into or out of the threaded opening as the helical gear is rotated; and
a motor with a worm gear engaged with the helical gear to provide torque feedback to the steering wheel by driving the helical gear.

2. The steering wheel system of claim 1, wherein a rotational axis of the steering wheel and the helical gear is aligned along a first axis, and wherein the motor and the worm gear are aligned along a second axis that is perpendicular to and offset from the first axis.

3. A steering wheel system for use in a steer-by-wire vehicle, the steering wheel system comprising:
a steering wheel; and
a torque feedback actuator assembly including:
a housing;
a helical gear rotatably disposed in the housing, the steering wheel coupled to and coaxially aligned with the helical gear;
an electronic control unit (ECU) coupled to the housing;
an angle sensor to measure a rotational angle of the helical gear, the angle sensor coupled to the ECU, the angle sensor extending through an opening in the housing such that the angle sensor is adjacent the helical gear; and
a motor with a worm gear engaged with the helical gear to provide torque feedback to the steering wheel by driving the helical gear.

4. The steering wheel system of claim 3, wherein the angle sensor is a Hall Effect sensor.

5. The steering wheel system of claim 1, further including a clockspring disposed between the housing and the steering wheel, the clockspring operatively coupled to the steering wheel to provide power to one or more electronic components on the steering wheel.

6. A vehicle comprising:
a dashboard;
a steering wheel system coupled to the dashboard to interface with a steer-by-wire system of the vehicle, the steering wheel system including:
a steering wheel;
a torque feedback actuator assembly including a helical gear, the steering wheel coupled and coaxially aligned with the helical gear, the helical gear to be driven in one direction or the other to rotate the steering wheel, the helical gear disposed between the steering wheel and the dashboard; and
an angle sensor to determine a rotational angle of the helical gear, the angle sensor disposed near an outer radial edge of the helical gear; and
an electronic control unit (ECU) to determine an angle of the steering wheel based on the rotational angle of the helical gear.

7. The vehicle of claim 6, wherein steering wheel system does not include a steering column extending into or through the dashboard.

8. The vehicle of claim 6, wherein the torque feedback actuator assembly includes a motor with a worm gear engaged with the helical gear, the steering wheel and the helical gear are aligned along a first axis, and the motor and worm gear are aligned a second axis that is perpendicular to and offset from the first axis.

9. The vehicle of claim 8, wherein the motor is disposed between the dashboard and the steering wheel.

10. The vehicle of claim 6, wherein the torque feedback actuator assembly includes a housing, the helical gear rotatably disposed within the housing.

11. The vehicle of claim 6, further including a collapsing mechanism that enables the steering wheel system to move toward the dashboard if a threshold force is exerted against the steering wheel system.

12. An apparatus comprising:
a helical gear to be coupled to and aligned with a rotational axis of a steering wheel, the helical gear including a threaded opening extending through a center of the helical gear;
a bolt threadably engaged with the threaded opening, the bolt to move in a linear direction into or out of the threaded opening as the helical gear is rotated; and
a motor with a worm gear engaged with the helical gear, the motor to drive the helical gear to provide torque feedback to the steering wheel, the motor and the worm gear aligned along an axis that is perpendicular to and offset from the rotational axis.

13. The apparatus of claim 12, further including a housing, the helical gear rotatably disposed within the housing, the housing including a first stop disposed on a first side of a head of the bolt and a second stop disposed on a second side of the head of the bolt, wherein, when the helical gear is rotated beyond a threshold amount in either direction, the head of the bolt engages one of the first or second stops and prevents further rotation of the steering wheel.

14. An apparatus comprising:
a helical gear to be coupled to and aligned with a rotational axis of a steering wheel;
an electronic control unit (ECU) circuit board;
an angle sensor to measure a rotational angle of the helical gear, the angle sensor coupled to the ECU circuit board adjacent the helical gear; and
a motor with a worm gear engaged with the helical gear, the motor to drive the helical gear to provide torque feedback to the steering wheel, the motor and the worm gear aligned along an axis that is perpendicular to and offset from the rotational axis.

15. The apparatus of claim 14, wherein the angle sensor is a Hall Effect sensor.

16. The steering wheel system of claim 1, wherein the first bolt extends into a first end of the threaded opening and the second bolt extends into a second end of the threaded opening opposite the first end.

17. The vehicle of claim 11, further including:
a rail coupled to the dashboard; and
a bracket slidably disposed in a slot in the rail, the steering wheel system coupled to the bracket.

18. The vehicle of claim 17, wherein a frictional interference between the bracket and the rail holds the bracket relative to the rail until the threshold force is exerted.

19. The vehicle of claim 17, further including a strap or tab disposed in the slot, the strap or tab to break when the threshold force is exerted.

20. The vehicle of claim 17, wherein the rail is coupled to the dashboard in an opening or recess formed in the dashboard.

* * * * *